United States Patent
Ferreira Costa et al.

(10) Patent No.: US 12,451,815 B2
(45) Date of Patent: Oct. 21, 2025

(54) VOLTAGE TRANSFORMER

(71) Applicant: CHRISTIAN-ALBRECHTS-UNI-VERSITÄT ZU KIEL, Kiel (DE)

(72) Inventors: Levy Ferreira Costa, Wettingen AG (CH); Marco Liserre, Mönkeberg (DE)

(73) Assignee: CHRISTIAN-ALBRECHTS-UNI-VERSITÄT ZU KIEL, Kiel (DE)

( * ) Notice: Subject to any disclaimer, the term of this patent is extended or adjusted under 35 U.S.C. 154(b) by 895 days.

(21) Appl. No.: 17/642,026

(22) PCT Filed: Sep. 11, 2020

(86) PCT No.: PCT/EP2020/075426
§ 371 (c)(1),
(2) Date: Jun. 10, 2022

(87) PCT Pub. No.: WO2021/048327
PCT Pub. Date: Mar. 18, 2021

(65) Prior Publication Data
US 2024/0048042 A1    Feb. 8, 2024

(30) Foreign Application Priority Data
Sep. 11, 2019  (DE) ............ 10 2019 124 330.0

(51) Int. Cl.
*H02J 7/00*  (2006.01)
*B60L 53/10*  (2019.01)
(Continued)

(52) U.S. Cl.
CPC ............ *H02M 5/225* (2013.01); *B60L 53/10* (2019.02); *H02M 1/0067* (2021.05); *H02M 3/24* (2013.01);
(Continued)

(58) Field of Classification Search
None
See application file for complete search history.

(56) References Cited

U.S. PATENT DOCUMENTS 10,583,743 B2 *  3/2020  Takada .............. B60K 6/46
11,799,392 B2 * 10/2023  Helling ............. B60L 1/00
(Continued)

FOREIGN PATENT DOCUMENTS

| CN | 109361206 A | 2/2019 |
| DE | 10 2012 220 118 A1 | 5/2014 |
| DE | 10 2018 122 587 A1 | 3/2020 |

OTHER PUBLICATIONS

Costa et al: "Comparison of Basic Power Cells for Quad-Active-Bridge DC-DC Converter in Smart Transformer", 17th European Conference on Power Electronics and Applications, p. 1-10, Sep. 8, 2015.
(Continued)

*Primary Examiner* — Arun C Williams
(74) *Attorney, Agent, or Firm* — WCF IP

(57) ABSTRACT

The invention relates to a voltage transformer for converting a primary-side alternating voltage at a first voltage level into a secondary-side alternating voltage at a second voltage level, the voltage transformer having a DC link in which a first direct voltage generated from the primary-side alternating voltage is converted into a second direct voltage by means of a DC-to-DC voltage converter, characterised in that an output circuit for providing a third direct voltage for the connection of at least one load is coupled to the DC link, in particular to the DC-to-DC voltage converter thereof.

13 Claims, 10 Drawing Sheets

Figure 1:
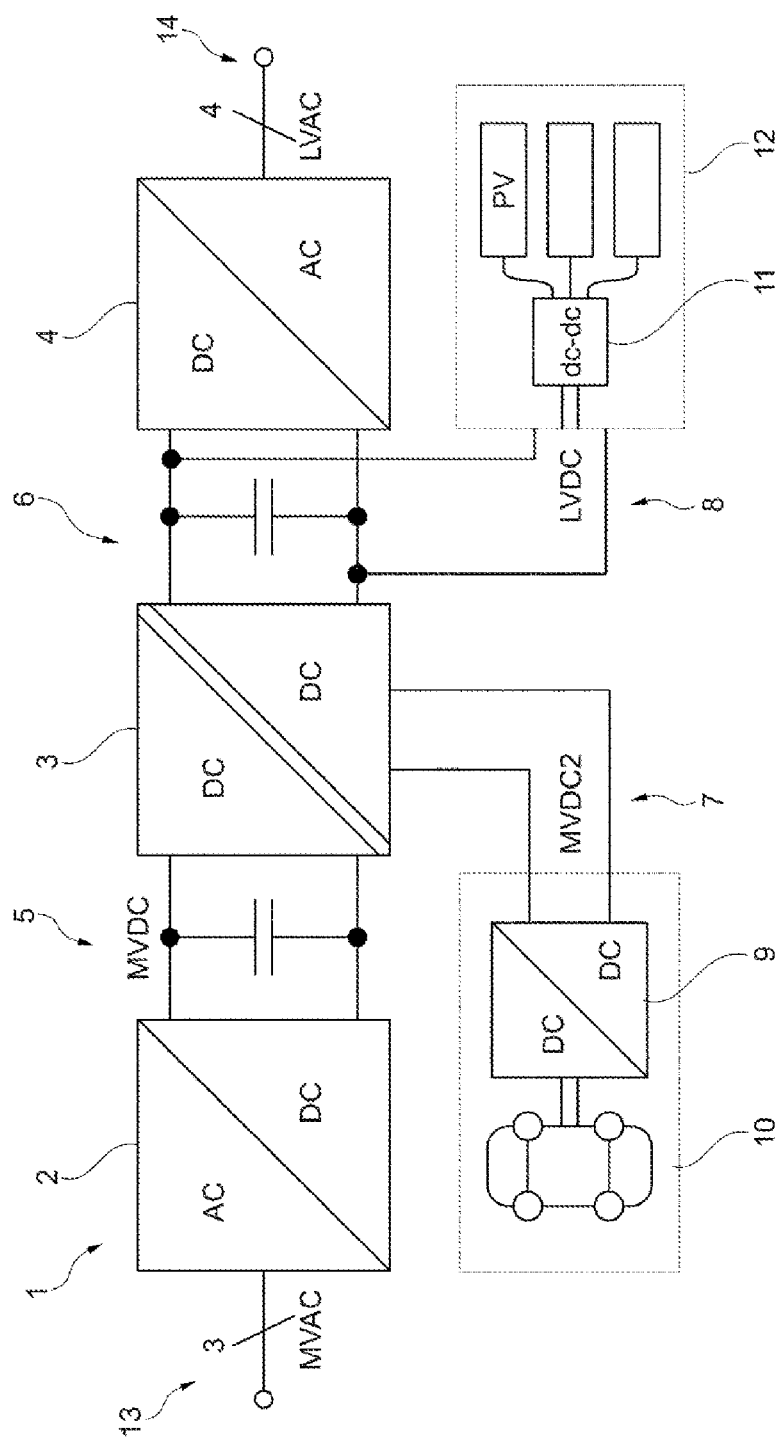

(51) Int. Cl.
*H02M 1/00* (2006.01)
*H02M 3/24* (2006.01)
*H02M 5/22* (2006.01)
*H02M 5/44* (2006.01)
*H02M 7/483* (2007.01)

(52) U.S. Cl.
CPC ........... *H02M 5/44* (2013.01); *H02M 7/4835* (2021.05); *B60L 2210/10* (2013.01)

(56) References Cited

U.S. PATENT DOCUMENTS

| | | | | |
|---|---|---|---|---|
| 2008/0031019 | A1* | 2/2008 | Alexander | H02M 7/4807 363/37 |
| 2008/0143292 | A1* | 6/2008 | Ward | B60L 8/003 320/101 |
| 2010/0080030 | A1* | 4/2010 | Wiegman | B60L 58/20 363/131 |
| 2011/0273917 | A1 | 11/2011 | Maitra et al. | |
| 2013/0134935 | A1* | 5/2013 | Maitra | B60L 53/22 320/109 |
| 2013/0201733 | A1* | 8/2013 | Divan | H02M 5/00 363/39 |
| 2013/0300380 | A1* | 11/2013 | Brunotte | H02M 7/4835 322/59 |
| 2015/0183330 | A1* | 7/2015 | Rajagopalan | B60L 53/22 307/9.1 |
| 2016/0146192 | A1* | 5/2016 | Kurthakoti Chandrashekhara | H02M 5/44 290/44 |
| 2020/0006970 | A1* | 1/2020 | Chen | H02M 7/217 |

OTHER PUBLICATIONS

Kumar et al: "Operation and control of smart transformer-based electric vehicles charging system", 43rd Annual Conference of the IEEE Industrial Electronics Society, p. 4266-4271, Oct. 29, 2017.

Zheng et al: "An Improved Control Strategy for Triple-port Power Electronic Transformer Under Unbalanced AC Loads Condition", 21st International Conference on Electrical Machines and Systems, p. 1046-1051, Oct. 7, 2018.

* cited by examiner

VOLTAGE TRANSFORMER

The invention relates to a voltage transformer for converting a primary-side alternating voltage at a first voltage level into a secondary-side alternating voltage at a second voltage level, wherein the voltage transformer has a direct voltage intermediate circuit in which a first direct voltage generated from the primary-side alternating voltage is converted into a second direct voltage by means of a DC-to-DC converter.

Voltage conversion through a voltage transformer of this type by means of a direct voltage intermediate circuit is widely used in electrical energy supply technology, for example in the case of voltage conversion from a medium voltage network to a low-voltage network. As a result of energy transition and increasing availability of electrically operated road vehicles, there is a growing need to provide electrical energy in the form of direct voltage at a comparatively high voltage level in order to provide the power which is required for charging accumulators.

The underlying object of the invention is to specify an efficient and cost effective option for providing electrical energy of this type.

This object is achieved with a voltage transformer of the type mentioned at the outset by coupling a decoupling circuit for providing a third direct voltage with the direct voltage intermediate circuit, in particular with the DC-to-DC converter thereof, for connecting at least one consumer. The invention has the advantage that the electrical energy can be provided in a particularly efficient manner and with little hardware effort by the third direct voltage. The invention can therefore be realized in a cost effective manner. One further advantage is that commercially available or pre-existing voltage transformers can be used for this purpose by merely adding the decoupling circuit for providing the third direct voltage.

The voltage transformer can optionally be used as an upconverter, downconverter or separator between the connected alternating voltage networks. If the voltage transformer is designed as an upconverter, the first voltage level is lower than the second voltage level. If the voltage transformer is designed as a downconverter, the second voltage level is lower than the first voltage level. If the voltage transformer is designed as a separator, the first voltage level is at least approximately equal to the second voltage level.

The first direct voltage can be smaller than, greater than or equal to the second direct voltage. In the case of a downconverter, it is advantageous, for example, if the second direct voltage is lower than the first direct voltage.

The third direct voltage can be smaller than, greater than or equal to the first and/or the second direct voltage. It is advantageous, for example, if the third direct voltage is at least approximately equal to the first direct voltage.

In terms of its superordinate circuit topology, the voltage transformer can be designed in the form of a neutral point clamped (NPC), a modular multilevel converter (MMC) or a cascaded H-bridge (CHB), for example. The CHB topology shall be used in the subsequent exemplary embodiments. However, the CHB topology typically does not have its own option for providing a third direct voltage for connecting at least one consumer. This disadvantage is overcome by the decoupling circuit according to the invention.

According to one advantageous embodiment of the invention, provision is made for the first voltage level to be the voltage level of an AC medium voltage network and for the second voltage level to be the voltage level of an AC low-voltage network. In this way, the invention can be used in a particularly efficient manner for realizing the electrical energy supply of DC voltage consumers at a relatively high voltage level, for example for supplying charging stations for electric vehicles.

According to one advantageous embodiment of the invention, provision is made for the decoupling circuit to be integrated into the DC-to-DC converter in an electrical and/or magnetic manner. An integration of this type of the decoupling circuit into the DC-to-DC converter has the advantage that the decoupling circuit can be kept simple in terms of hardware. The decoupling circuit can be supplied with electrical energy from the DC-to-DC converter in an inductive manner, for example, which has the advantage that the actual function of the DC-to-DC converter for converting the first direct voltage into the second direct voltage is not or is merely insignificantly influenced.

According to one advantageous embodiment of the invention, provision is made for the DC-to-DC converter to be constructed in a modular manner from a multiplicity of individual DC-DC converter modules which are connected to one another in parallel on the secondary side. A modular structure of this type has the advantage that the entire voltage transformer can be optimized in terms of error rate and fail-safety and is scalable in different orders of magnitude by the number of DC-DC converter modules used. It is possible to exchange individual DC-DC converter modules for repair purposes in a simple manner.

If the voltage transformer is designed as a downconverter, it is advantageous, for example, to connect the DC-DC converter modules to one another in parallel on the secondary side. In this way, a second direct voltage is provided with a reduced voltage level compared to the first direct voltage, wherein the available currents are increased as a result of the parallel connection.

According to one advantageous embodiment of the invention, provision is made for the DC-DC converter modules to be connected on the primary side either directly in series or via AC-DC converter modules in series. In this way, the primary-side voltage load of the DC-DC converter modules can be distributed over a multiplicity of modules, such that the individual modules can be constructed in a comparatively simple and cost effective manner. Nevertheless, a comparatively high primary-side first direct voltage can be processed as a result of this series connection.

According to one advantageous embodiment of the invention, provision is made for a decoupling module to be added to some or all of the DC-DC converter modules on the primary side, wherein the decoupling modules are connected to one another to form the decoupling circuit. In this way, the decoupling circuit can also be realized in a modular manner, such that the voltage transformer also realizes the advantages of the modularity in terms of the decoupling circuit, such as scalability and advantages related to fail-safety and repair, for example in that individual decoupling modules can be exchanged in the event of a fault.

According to one advantageous embodiment of the invention, provision is made for the decoupling modules to be connected to one another in series, in order to provide the third direct voltage. The decoupling circuit is therefore formed by the series connection of the decoupling modules. The third direct voltage can therefore be provided at a high voltage level in a simple manner.

According to one advantageous embodiment of the invention, provision is made for a DC-DC converter module to have a primary-side converter cell and a secondary-side converter cell which are coupled with one another via galvanically isolated windings of a transformer. This also makes it possible to realize the individual DC-DC converter modules in turn in a modular manner. In the event of a fault, only the defective part may then be exchanged, such as only a primary-side converter cell or only a secondary-side converter cell, for example. The converter cells can have a clocked semiconductor circuit, for example.

According to one advantageous embodiment of the invention, provision is made for the decoupling module to be coupled with a further winding of the transformer, such that the decoupling module is supplied with electrical energy via the transformer in an inductive manner. In this way, the decoupling module is galvanically decoupled from the other components of the DC-to-DC converter, so that their mode of operation is not influenced. The transformer can be designed as a multiple winding transformer, for example. Depending on the third direct voltage which is to be generated, the decoupling module can be coupled with the transformer on the primary side, i.e. on the side of the first direct voltage (MVDC), and/or on the secondary side, i.e. on the side of the second direct voltage (LVDC).

According to one advantageous embodiment of the invention, provision is made for the transformer to have a magnetic core on which the windings of the transformer are arranged. This enables particularly efficient inductive energy transmission between the windings.

The DC-DC converter modules can be designed, for example, as a multiple active bridge, full resonant topology, current source topology, impedance source topology, or the like with a respective transformer connected between the primary side and the secondary side of a converter module. A multiple active bridge can be realized in the form of a dual active bridge or a quadruple active bridge, for example. Switched power semiconductors are used for this type of voltage transformer. For energy transmission between the primary side and the secondary side, pulsed, square-wave signals are generated via the power semiconductors on both sides, i.e. the primary side and the secondary side, through clocked switching of the power semiconductors. Energy transmission takes place via a phase shift between the signals between the primary side and the secondary side (phase shift modulation). Other controls, such as duty cycle control or the like, for example, can also advantageously be used. In comparison to conventional voltage transformers, which are operated with comparatively low frequency, a high-frequency transmission is used in the case of the multiple active bridge. The transformer required for this purpose requires little space in comparison to low-frequency transmission, such that voltage transformers of this type can be realized in a more compact and consequently more cost effective manner.

In the context of the present invention, the indefinite term "a" is not to be understood as numeral. If, for example, reference is made to a component, this is to be interpreted in the sense of "at least one component". In this case, the abbreviation DC stands for direct current, the abbreviation AC for alternating current.

The invention is explained in greater detail hereinafter by means of exemplary embodiments using drawings.

In the drawings

FIG. 1—shows a voltage transformer in a block diagram representation and

Figure 2:
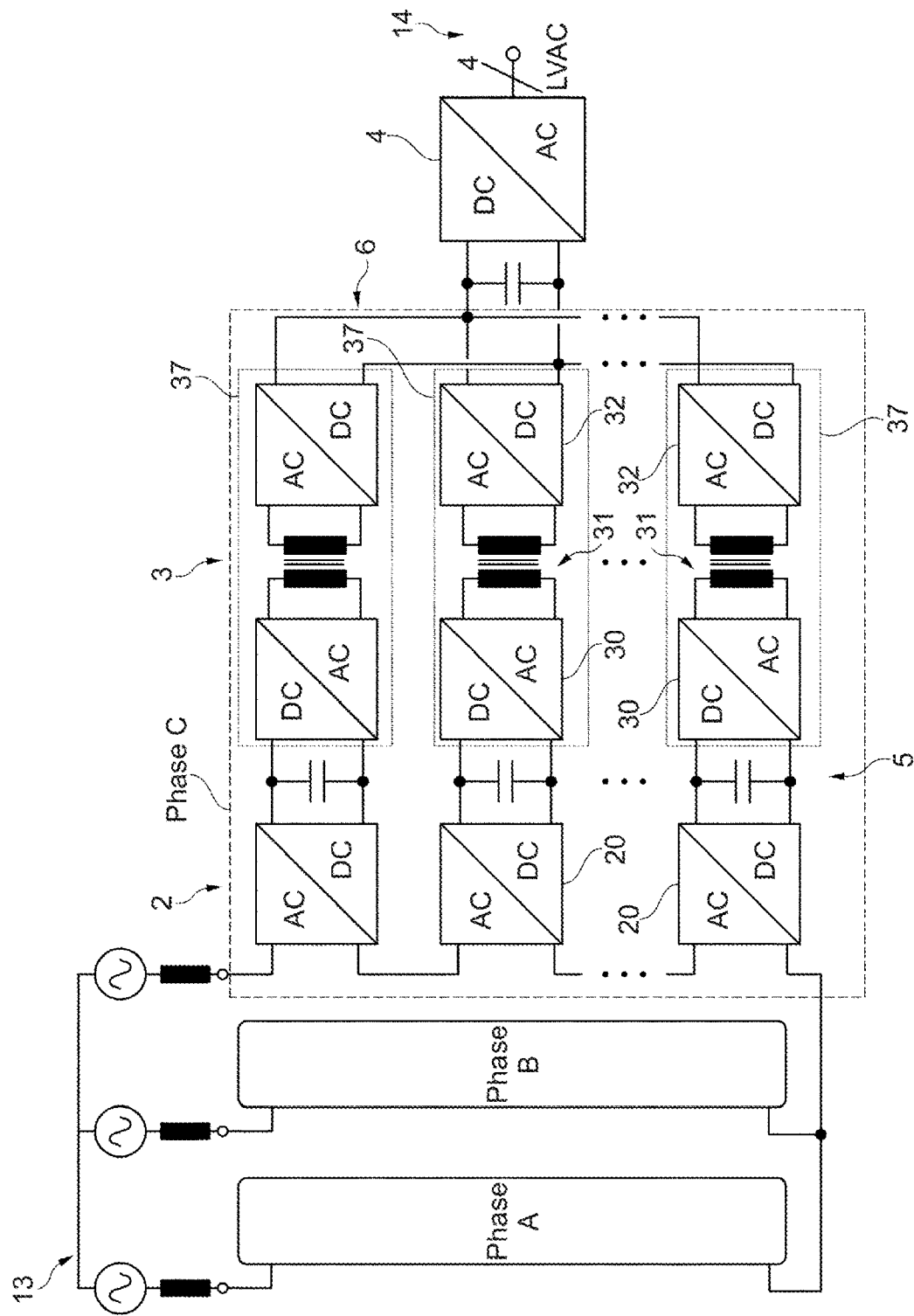

FIG. 2—shows a voltage transformer in the form of a cascaded H-bridge (CHB) and

Figure 3:
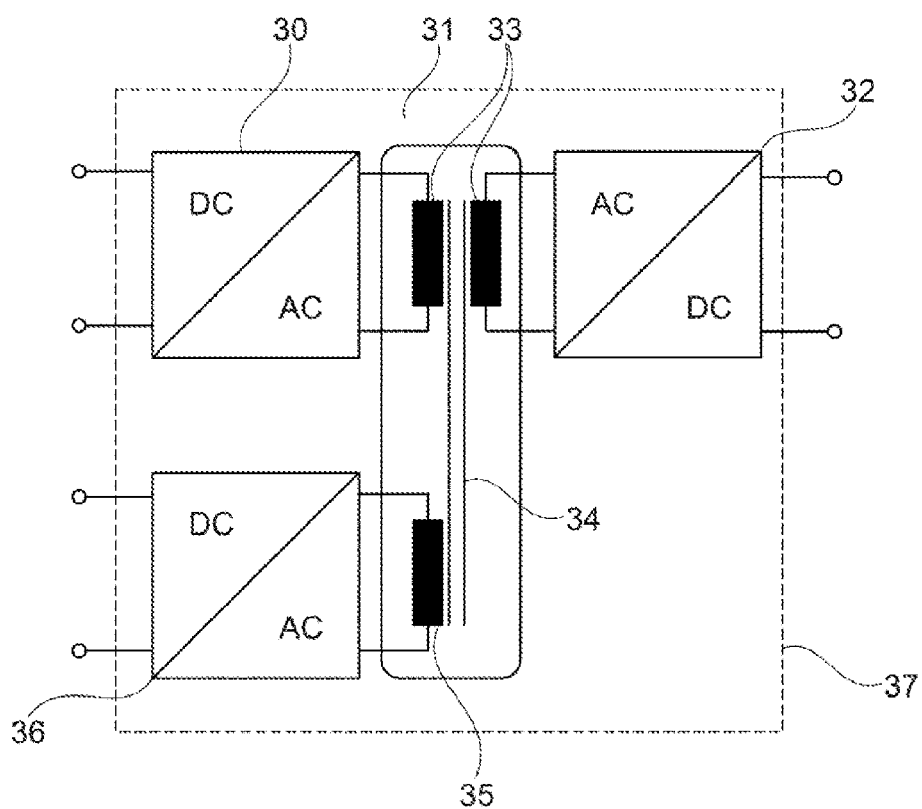

FIG. 3—shows a DC-DC converter module and

Figure 4:
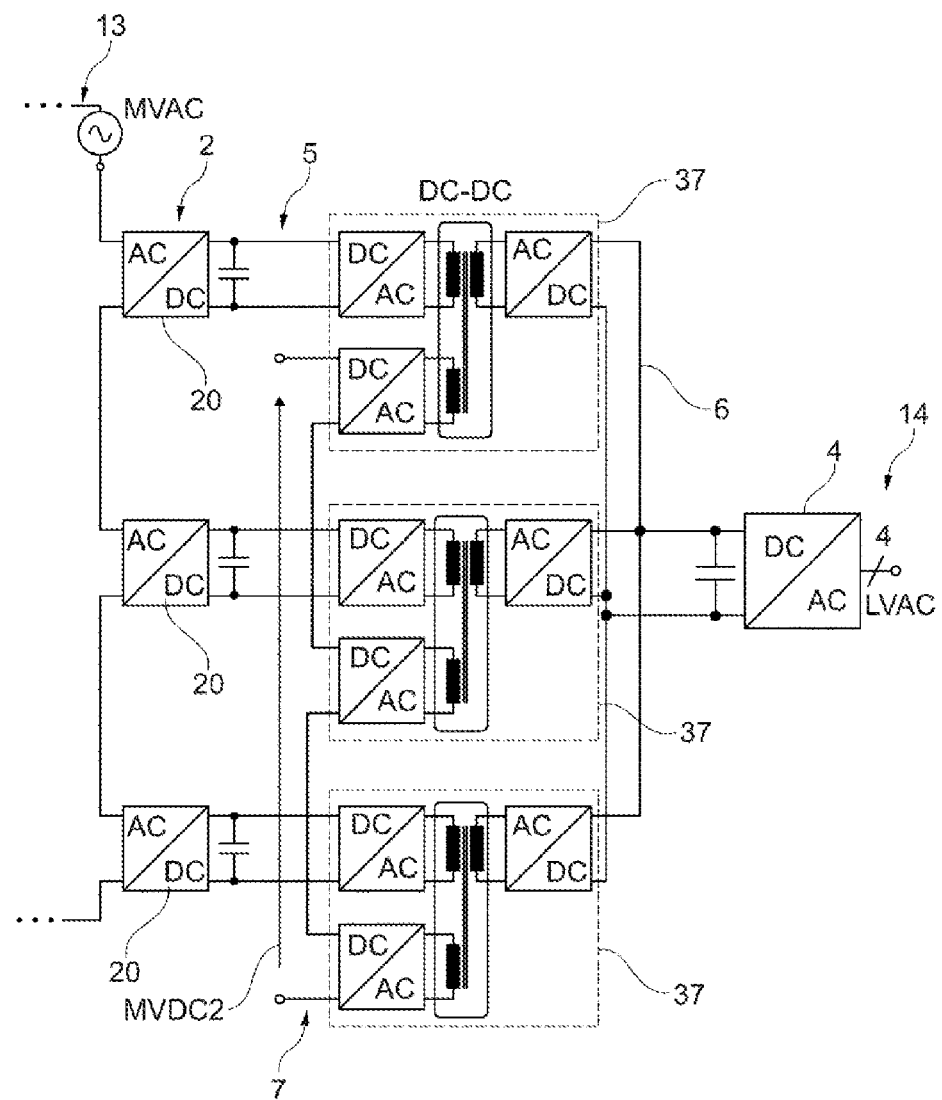
Figure 5:
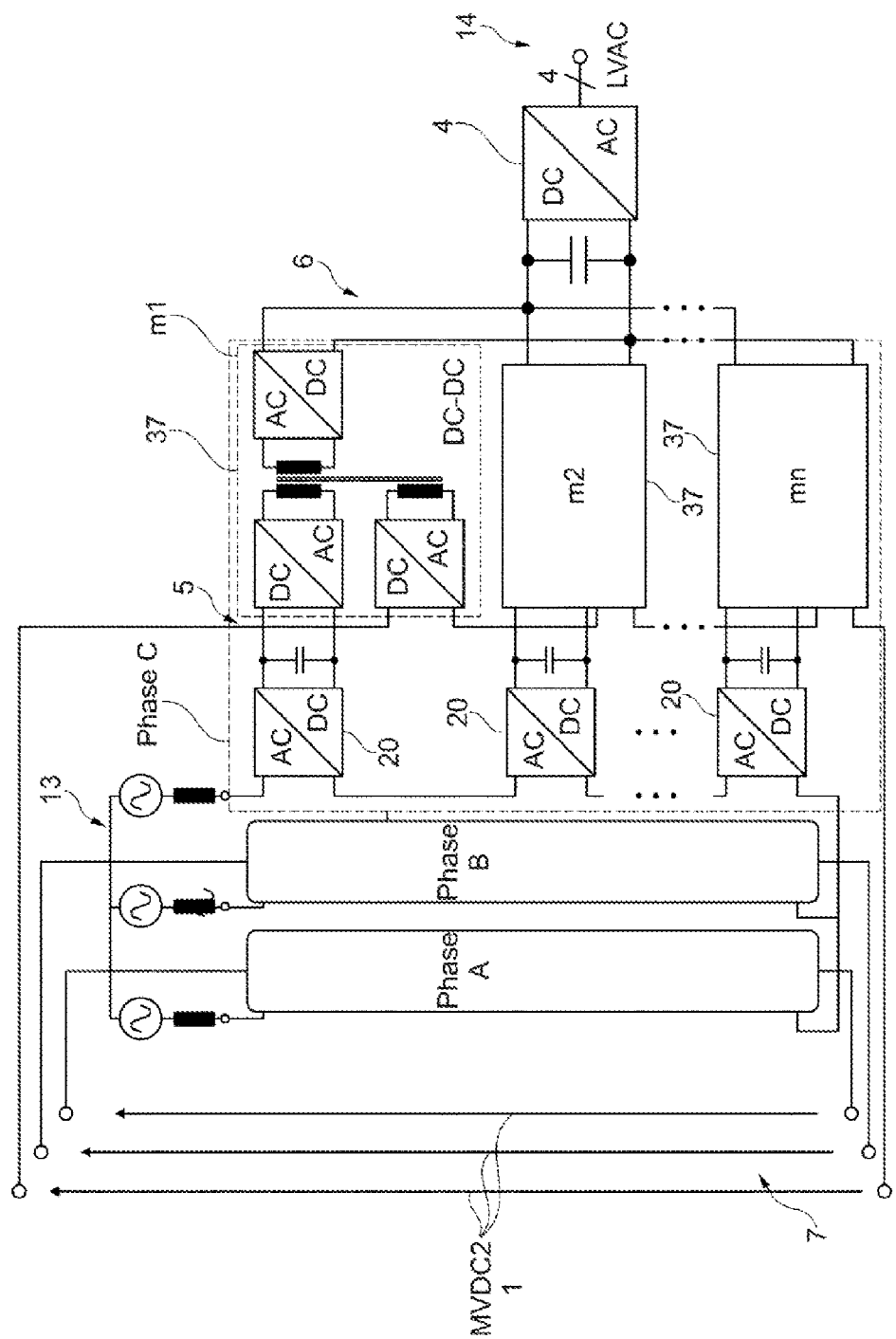
Figure 6:
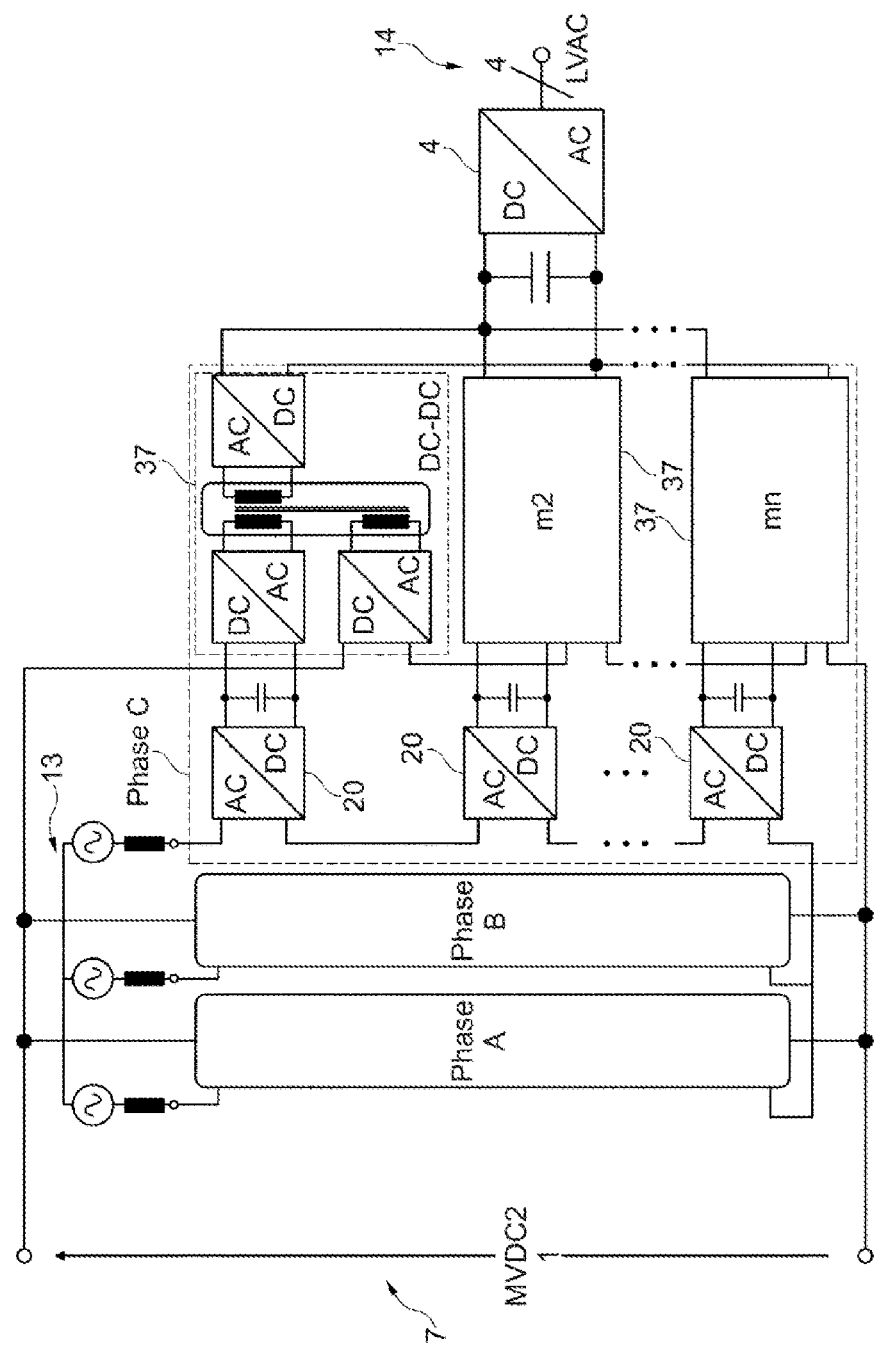
Figure 7:
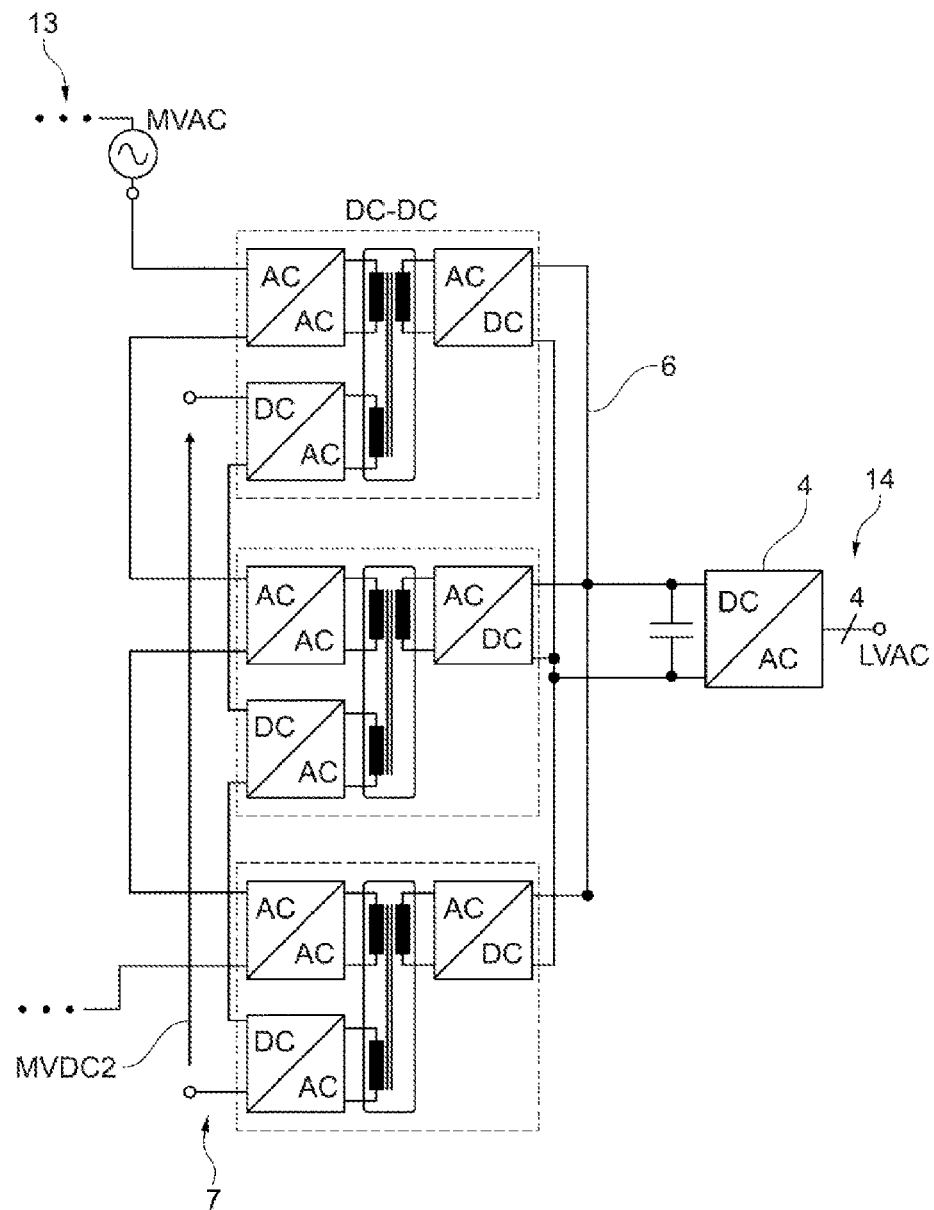
Figure 8:
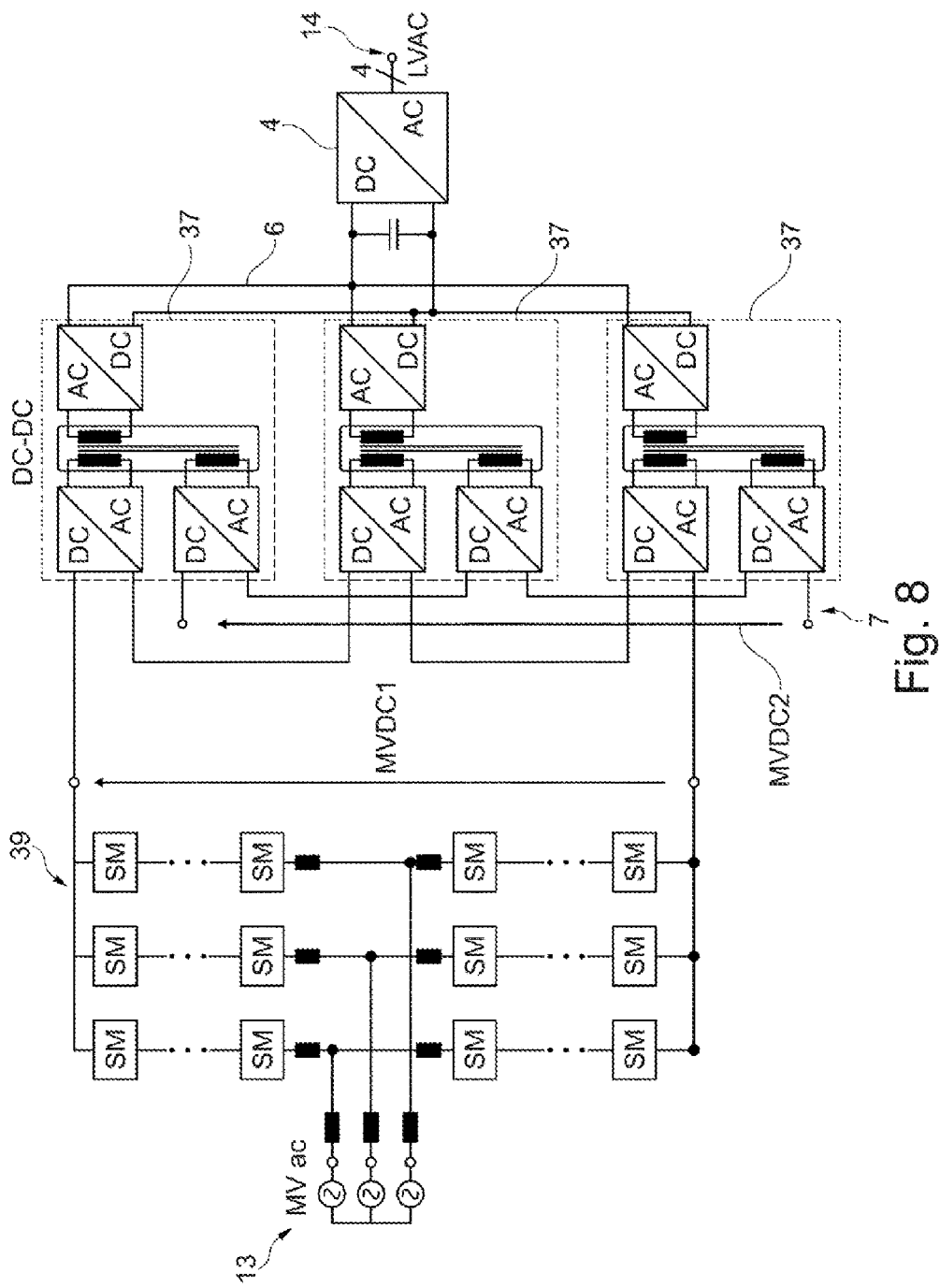
Figure 9:
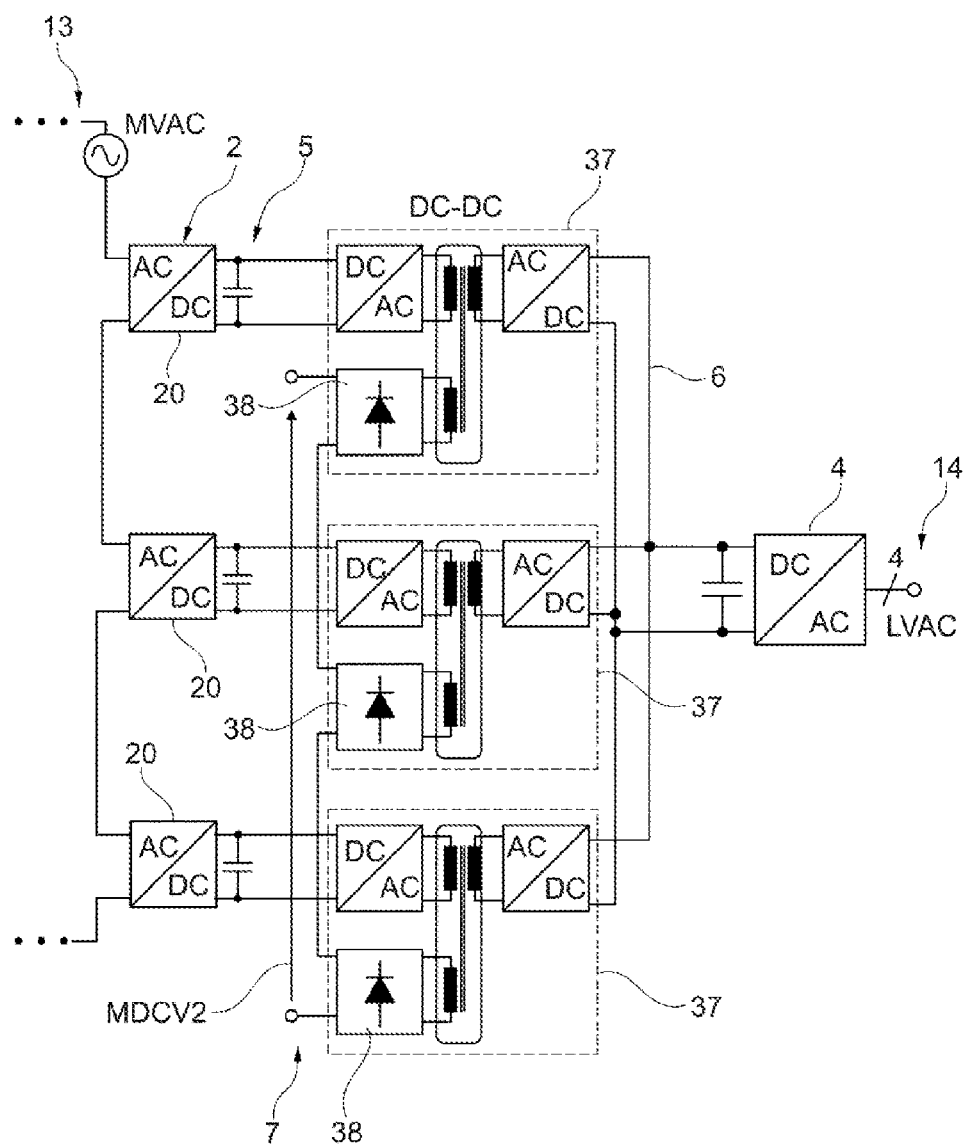
Figure 10:
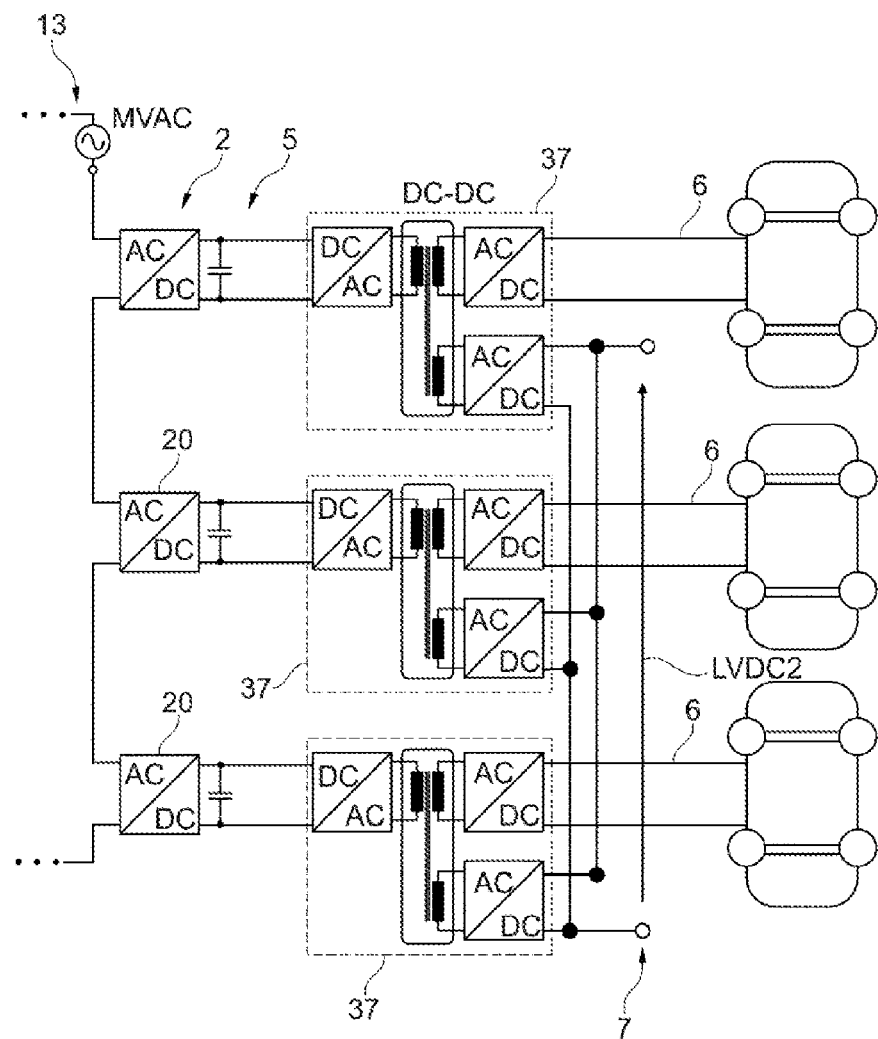

FIG. 4—shows the circuit of one phase of the voltage transformer according to FIG. 2 using DC-DC converter modules according to FIG. 3 and FIG. 5—shows the topology of the entire voltage transformer using DC-DC converter modules according to FIG. 3 and FIG. 6—shows the voltage transformer according to FIG. 5 with decoupling circuits connected to one another in parallel and FIG. 7—shows one alternative embodiment of the circuit of one phase of the voltage transformer and FIG. 8—shows a voltage transformer with a modular multilevel converter and FIG. 9—shows the circuit of one phase of the voltage transformer according to FIG. 2 with an alternative form of the decoupling modules and FIG. 10—shows the circuit of one phase of the voltage transformer with provision of the third direct voltage at a different voltage level.

The reference numbers used in the figures have the following allocation:

1 Voltage transformer
2 AC-DC converter
3 DC-to-DC converter
4 DC-AC converter
5 primary-side direct voltage circuit
6 secondary-side direct voltage circuit
7 decoupling circuit
8 coupling network
9 DC-DC converter
10 consumer
11 DC-DC converter
12 electrical system
13 primary-side alternating voltage network
14 secondary-side alternating voltage network
20 AC-DC converter modules
30 converter cell
31 transformer
32 converter cell
33 winding
34 core
35 winding
36 decoupling module
37 DC-DC converter module
38 diode full bridge
39 modular multilevel converter
40 integrated converter module
MVAC primary-side alternating voltage
MVDC first direct voltage
LVAC secondary-side alternating voltage
LVDC second direct voltage
MVDC2,
LVDC2 third direct voltage FIG. 1 shows the voltage transformer 1 in an electrical energy supply system in which a primary-side alternating voltage network 13, for example a three-phase AC medium voltage network, is coupled with a secondary-side alternating voltage network 14, for example a four-line AC low-voltage network.

The primary-side alternating voltage network 13 is connected to a direct voltage intermediate circuit 3, 5, 6 via an AC-DC converter 2. A primary-side alternating voltage MVAC at a first voltage level is converted into a first direct voltage MVDC by the AC-DC converter 2. In the direct voltage intermediate circuit 3, 5, 6, a DC-to-DC converter 3 is present which is coupled with the direct voltage output of the AC-DC converter 2 via a primary-side direct voltage circuit 5 and to which the first direct voltage MVDC is thus supplied. The DC-to-DC converter 3 converts the first direct voltage MVDC into a second direct voltage LVDC. The DC-to-DC converter 3 is coupled with a DC-AC converter 4 via a secondary-side direct voltage circuit 6. The DC-AC converter 4 converts the second direct voltage LVDC supplied to it from the DC-to-DC converter 3 into a secondary-side alternating voltage LVAC of the secondary-side alternating current network 14.

In the secondary-side direct voltage circuit 6, an electrical system 12 can be connected which is operated with a direct voltage at a low voltage level LVDC, for example a photovoltaic system which, via a DC-DC converter 11, is connected to a coupling network 8 via which the electrical system 12 is connected to the secondary-side direct voltage circuit 6.

In addition, FIG. 1 shows a consumer 10 which is operated with a third direct voltage MVDC2 at a high voltage level. It can be a charging station for electric vehicles, for example, which is coupled with the third direct voltage MVDC2 via a DC-DC converter 9. According to the invention, the third direct voltage MVDC2 is provided via a decoupling circuit 7 which is coupled with the direct voltage intermediate circuit 3, 5, 6, in particular with the DC-to-DC converter 3. Advantageous ways of coupling the decoupling circuit 7 with the DC-to-DC converter 3 are explained hereinafter.

The normal (known) structure of a voltage transformer without a decoupling circuit 7 of this type shall firstly be described by means of FIG. 2. FIG. 2 shows a voltage transformer in CHB topology. In this case, the circuit components for one phase (phase C) of the three-phase primary-side alternating voltage network 13 are specified in detail in the right part of FIG. 2. For the other phases A, B, a comparable circuit is included which is only depicted as a block for the purpose of simplification. The circuit in a phase A, B, C firstly has a series connection of primary-side AC-DC converter modules 20 which together (as a series connection) form the AC-DC converter 2 of a phase A, B, C. In this way, the AC-DC converter 2 can also be constructed in a modular manner.

A DC-DC converter module 37 is connected downstream of a respective AC-DC converter module 20. The entirety of the DC-DC converter modules 37 forms the DC-to-DC converter 3. The DC-DC converter modules 37 can be connected in parallel on the secondary side and are then connected to the direct voltage connection of the DC-AC converter 4. The individual DC-DC converter modules 37 can have a structure with 2 converter cells 30, 32 in each case which are connected via a transformer 31. A DC-DC converter module can in this way be designed as a multiple active bridge, for example.

As one aspect of the present invention, FIG. 3 shows the extension of a DC-DC converter module 37 to include a decoupling module 36. It is recognizable that the converter cells 30, 32 are coupled with one another in an inductive manner via windings 33 of the transformer 31. The decoupling module 36 can be connected to the converter cells 30, 32 in an inductive manner, for example, by extending the transformer 31 to include an additional winding 35. The transformer 31 can have a magnetic core 34 on which the windings 33, 35 are arranged, in order to increase the degree of coupling between the windings 33, 35. The decoupling module 36 can be designed as a DC-DC converter cell, for example, which has a similar functionality and a similar structure to the converter cells 30, 32.

By means of a cut-out of the voltage transformer from FIG. 2 which only shows the structure of phase C, FIG. 4 shows the integration of DC-DC converter modules 37 of the type described in FIG. 3. In particular, it is recognizable that the individual decoupling modules 36 are connected in series. The desired third direct voltage MVDC2 can be tapped via the series connection of the decoupling modules 36, which thus represent the decoupling circuit 7.

FIG. 5 shows the integration of the DC-DC converter modules 37 into the complete voltage transformer according to FIG. 2 in a strongly schematized manner. In this case, a DC-DC converter module m1 is fully represented only by means of phase C, the remaining modules m2 to mn are constructed in a comparable manner.

As can be recognized, a third direct voltage MVDC2 in each case decoupled from other third direct voltages MVDC2 can be obtained from each phase A, B, C in the circuit arrangement represented. Three separate consumers 10 can be supplied with the third direct voltage MVDC2 accordingly, for example. It is also possible to connect two or all three of the branches carrying the third direct voltage MVDC2 in parallel or in series. In a parallel connection, the available current can be increased, in a series connection, the available direct voltage can be increased.

FIG. 6 shows a parallel connection of this type of all three branches carrying the third direct voltage MVDC2.

As can be recognized, the invention thus also allows for scalability of the third direct voltage MVDC2 provided via the decoupling circuit both in terms of the voltage level and in terms of the available current. The different third direct voltages MVDC2 provided via the individual phases A, B, C are galvanically decoupled from one another, which opens up a multiplicity of application possibilities and interconnection options. A multiplicity of control and error response scenarios can be realized by appropriately controlling the DC-DC converter modules 37 and the decoupling modules 37, for example by way of software-controlled regulation. In particular, realizing the voltage transformer in a CHB topology can be implemented advantageously, since the CHB topology is already established and well received in energy supply technology.

FIG. 7 shows an embodiment of the voltage transformer in which the AC-DC converter modules 20 described previously as individual components by means of FIG. 4, for example, and the respective converter cells 30 of a DC-DC converter module 37 can be combined, for example as an integrated converter module 40. Moreover, the decoupling circuit can remain identical. In the embodiment according to FIG. 7, direct input-side processing of an alternating voltage from the primary-side alternating voltage network 13 is thus possible.

FIG. 8 shows an embodiment of the voltage transformer, specifically by means of one phase, as represented in FIG. 4, wherein the primary-side alternating voltage network 13 is connected to the direct voltage input side of the DC-DC converter modules 37 via a modular multilevel converter 39. The modular multilevel converter 37 therefore replaces the individual AC-DC converters 20 in this case.

In the exemplary embodiments described previously, the decoupling circuit has a fundamentally bidirectional functionality as a result of the bidirectional mode of operation of the decoupling modules 36 used. In applications in which the bidirectionality is not required, this decoupling circuit can also be designed in a unidirectional manner. For this purpose, instead of the decoupling modules 36, unidirectional modules 38 can be used which can be designed in terms of circuitry, for example, as diode full bridges, as represented in FIG. 9. In this case, the power flow can still be controlled independently.

In the exemplary embodiments described previously, the decoupling module 36 was used in each case in such a way that the third direct voltage is provided at a comparatively high direct voltage level. As represented in FIG. 10, the decoupling module 36 can be connected and configured in such an alternative manner that a voltage LVDC2 at a low voltage level is provided as a third direct voltage, which is advantageous, for example, if separate loads are to be supplied at the voltage level LVDC2. In this way, an additional electrical energy supply can be provided for charging electric vehicles. This topology is in particular advantageous with an input-side cascaded H-bridge (CHB) topology. The additional LVDC intermediate circuit (LVDC2) makes it possible to compensate for the asymmetries in the CHB in the event of different loads. The outputs of the decoupling circuits 7 can be connected in parallel.

It is also possible to realize the DC-DC converter module 37 with decoupling modules 36 on both sides in such a way that, on the one hand, a third direct voltage MVDC2 is provided at a high voltage level and, on the other hand, a third direct voltage LVDC2 is provided at a low voltage level.

The invention claimed is:

1. A voltage transformer for converting a primary-side alternating voltage (MVAC) at a first voltage level into a secondary-side alternating voltage (LVAC) at a second voltage level, comprising:
   a direct voltage intermediate circuit with a DC-DC voltage converter for converting a first DC voltage generated from a primary-side AC voltage into a second DC voltage,
   a decoupling circuit for providing a third DC voltage for connecting at least one load couplable to the DC-DC voltage converter, wherein the DC-DC voltage converter has a plurality of DC-DC converter modules which are either connected directly in series on a primary side or are connected in series by AC-DC converter modules, wherein the DC-DC converter modules each have a transformer and have a primary-side converter cell and a secondary side converter cell, wherein the primary-side converter cell and the secondary side converter cell are coupled to one another by galvanically isolated windings of the transformer, and
   a decoupling module coupled to a further winding of the transformer so that the decoupling module is inductively supplied with electrical energy by the transformer,
   wherein the decoupling circuit for providing the third DC voltage is connected in series or in parallel respectively by a series connection or parallel connection of the transformer.

2. The voltage transformer as claimed in claim 1, wherein a first voltage level of the first DC voltage is a voltage level of an AC medium voltage network and wherein a second voltage level of the second DC voltage is a voltage level of an AC low-voltage network.

3. The voltage transformer as claimed in claim 1 wherein the decoupling circuit is integrated into the DC-DC voltage converter in an electrical and/or magnetic manner.

4. The voltage transformer as claimed in claim 1 wherein the DC-DC voltage converter is constructed in a modular manner from a multiplicity of individual DC-DC voltage converter modules which are connected to one another in parallel on a secondary side.

5. The voltage transformer as claimed in claim 4, wherein the DC-DC voltage converter modules are connected on the primary side either directly in series or via AC-DC converter modules in series.

6. The voltage transformer as claimed in claim 4 further comprising one or more decoupling modules added to some or all of the DC-DC voltage converter modules on the primary side, wherein the decoupling modules are connected to one another to form the decoupling circuit.

7. The voltage transformer as claimed in claim 6, wherein the one or more decoupling modules are connected to one another in series to provide the third DC voltage.

8. The voltage transformer as claimed in claim 1 wherein the transformer has a magnetic core on which windings of the transformer are arranged.

9. The voltage transformer as claimed in claim 1 further comprising a charging station for charging electric vehicles coupled with the third DC voltage.

10. The voltage transformer as claimed in claim 9, wherein the charging station is coupled with the third DC voltage by a DC-DC voltage converter.

11. A method for providing electrical energy for charging electric vehicles with direct current, comprising:
   converting, using a voltage converter a primary-side AC voltage at a first voltage level into a secondary-side AC voltage at a second voltage level, wherein the voltage converter has an intermediate DC voltage circuit in which a first DC voltage generated from the primary-side AC voltage is converted into a second DC voltage by a DC-DC voltage converter, and
   a third DC voltage decoupled from the intermediate DC voltage circuit by a decoupling circuit is fed into the electric vehicle for charging the electric vehicle,
   wherein the third DC voltage is formed by series or parallel connection of decoupling modules, wherein each of the decoupling modules is supplied with electrical energy inductively by a transformer,
   wherein the intermediate DC voltage circuit has a plurality of DC-DC converter modules which are either connected directly in series on the primary side or connected in series by AC-DC converter modules, wherein the DC-DC converter modules each have a transformer and have a primary-side converter cell and a secondary-side converter cell which are coupled to one another by galvanically isolated windings of the transformer,
   wherein a decoupling module is coupled to a further winding of the transformer.

12. The method as claimed in claim 11 wherein the third DC voltage is decoupled from the DC-DC converter of the intermediate DC voltage circuit.

13. The voltage transformer as claimed in claim 1 wherein the decoupling circuit is coupled with the intermediate DC voltage circuit by the DC-DC converter of the intermediate DC voltage circuit.

* * * * *